Jan. 23, 1962  K. S. POWELL  3,018,093
LIQUID DISTRIBUTION SYSTEM
Filed May 2, 1958  2 Sheets-Sheet 2
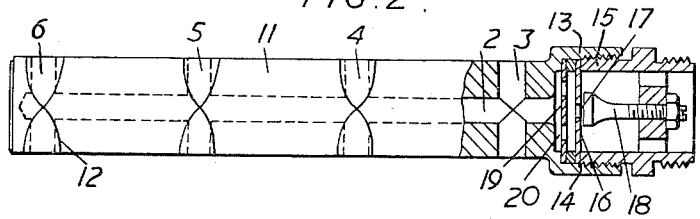
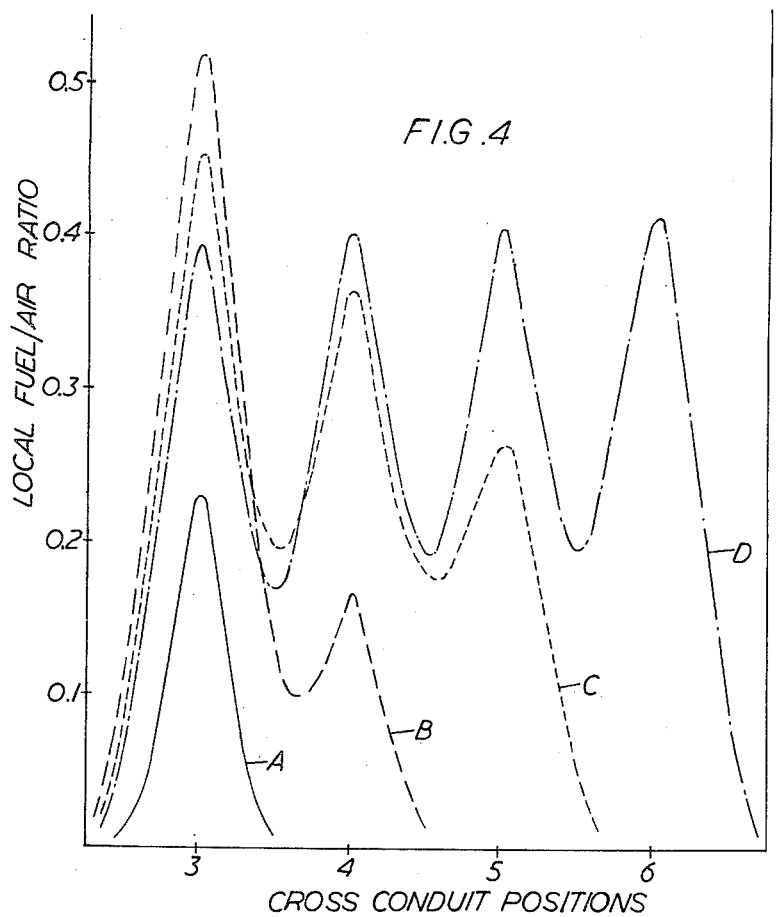
Inventor
Kenneth Stanley Powell
By Bailey, Stephens & Huettig
Attorneys

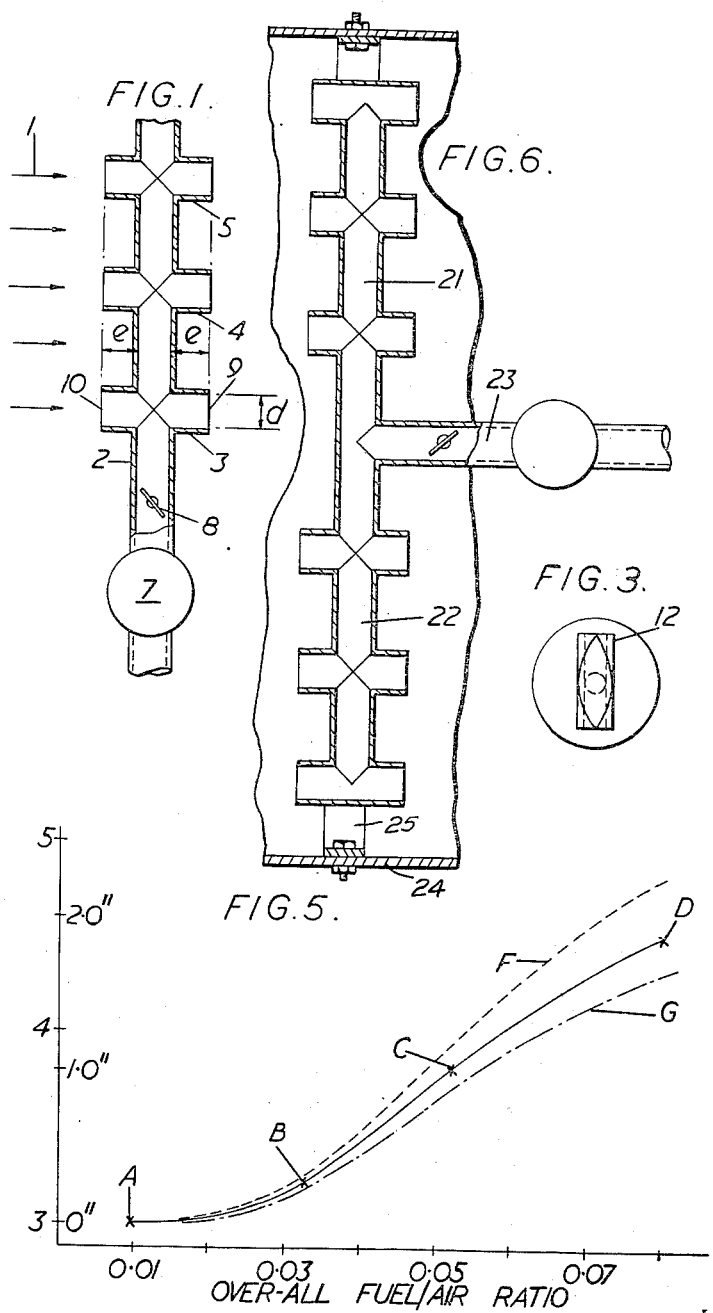

3,018,093
LIQUID DISTRIBUTION SYSTEM

Kenneth Stanley Powell, Bristol, England, assignor, by mesne assignments, to Bristol Siddeley Engines Limited, Bristol, England, a British company
Filed May 2, 1958, Ser. No. 732,642
Claims priority, application Great Britain May 9, 1957
6 Claims. (Cl. 261—41)

This invention relates to apparatus for injecting liquid into a moving stream of gaseous fluid in such a manner that at a low rate of liquid supply the liquid is injected into a part only of the cross-section of the stream and that as the rate of liquid supply is increased the liquid is injected into a progressively larger part of the cross-section of the stream.

One field of application of apparatus capable of operating in this way is in combustion systems of the kind in which liquid fuel is injected into a moving stream of air or other gaseous combustion-supporting medium confined within a duct, it being desirable in such systems that at a low ratio of fuel flow to mass air flow the fuel shall be dispersed over a selected part of the cross-section of the stream, usually a central part, so as to produce a readily ignitible mixture in that part, and that as the ratio of fuel flow to mass air flow is increased the fuel shall be increasingly widely distributed over the cross-section of the stream so that the local fuel/air ratio in the selected part shall remain within readily combustible limits.

Where such a combustion system forms part of a propulsion plant for an aerial vehicle operating, as is most usual, with constant air-stream Mach number in the duct, over a range of altitude, maintenance of a selected ratio of fuel flow to mass air flow involves changes in fuel flow with altitude to compensate for the changes in air density and air velocity in the duct and it is undesirable that such changes in fuel flow, not involving a change in fuel/air ratio, should cause changes in the pattern of fuel distribution over the cross-section of the duct.

While it is possible to obtain a variation of distribution by mechanical means, as for example by spacing across the stream a number of liquid delivery orifices with spring loaded closure members set to open at different fuel supply pressures, or by varying the velocity with which liquid particles are sprayed transversely across the stream, such arrangements produce patterns of liquid distribution which vary substantially with altitude when the ratio of liquid flow to mass gas flow is held constant.

The object of the present invention is to provide an apparatus for the purpose described giving a distribution pattern which varies less in such circumstances.

According to the invention, apparatus for injecting liquid into a moving stream of gaseous fluid comprises a main conduit, two or more straight cross conduits open at both ends, all the cross conduits having a common axial direction and each intersecting the main conduit at a different position along its length, each cross conduit being at its intersection with the main conduit of substantially the same flow path width, normal to the axes of both conduits, as the main conduit, and each cross conduit extending on each side of the main conduit a distance not substantially less than the said width at its intersection with the main conduit, means for aligning the cross conduits with the flow direction of the stream, means for supplying liquid into one end of the main conduit, and means for controlling the flow of the liquid into the main conduit.

In use of the apparatus the flow of liquid into the main conduit is controlled between a value at which the whole of the liquid flowing into the main conduit is dispersed in admixture with gaseous fluid out through the downstream end of the cross conduit nearest the liquid inlet end of the main conduit and a higher value at which, at the highest mass flow rate of the gaseous fluid, some of the liquid is dispersed in admixture with gaseous fluid out of the downstream ends of all the cross conduits.

The number of cross conduits should not be so great that, at the highest mass flow rate of the gaseous fluid, the cross conduit nearest the liquid inlet end of the main conduit has to run full of liquid, so far as discharged from its downstream end is concerned, before liquid reaches the cross conduit farthest from the liquid inlet end of the main conduit.

If this condition should be reached before the desired maximum rate of liquid discharge has been reached the cross-sectional areas of the conduits should be increased.

The invention is illustrated in the accompanying drawings in which:

FIGURE 1 shows the arrangement diagrammatically;

FIGURES 2 and 3 show a constructional example in side elevation, partially sectioned, and in end elevation respectively;

FIGURES 4 and 5 are typical performance curves; and

FIGURE 6 is a diagram of another arrangement.

In FIGURE 1 the direction of flow of the moving stream of gaseous fluid is indicated by the arrows 1. A main conduit 2 is disposed transversely across the path of the stream and is intersected by a number of cross conduits having a common axial direction, three such conduits being shown and being numbered 3, 4 and 5. Means (not shown) are also provided for keeping these cross conduits aligned with the direction of the stream. Where the stream is confined in a duct determining its direction the said means may be a rigid connection between the main conduit and the wall of the duct. Alternatively the main conduit could be fixed to a body having a preferential direction of orientation relatively to the stream, for example, part of an aerial vehicle passing through the fluid, or, if the direction of the stream is variable the assembly of conduits could be pivotally mounted and constrained by a vane or the like to maintain the cross conduits in alignment with the stream. While the main and cross conduits are shown respectively at right angles and parallel to the direction of the stream some variation of these angles may be found permissible. All the conduits are shown circular in cross-section and of the same diameter and at the intersections the axes of the intersecting conduits intersect, so that the flow path width remains constant. Each cross conduit 3, 4, 5 extends upstream and downstream of the main conduit 2 a distance $e$ which is not substantially less than the diameter $d$ of the conduits. Liquid is supplied into one end of the main conduit 2 by any suitable means, represented as a pump 7, and the flow is controlled by any other suitable means, represented as a butterfly valve 8. It is found that, with increasing flow of liquid, up to a first critical flow all the liquid is dispersed out of the downstream end 9 of the first cross conduit 3 in admixture with gaseous fluid which has entered the conduit 3 through its upstream end 10, and that when this flow is exceeded some of the liquid flows further along the main conduit 2 to be similarly dispersed out through the downstream end of the next cross conduit 4. After a second critical value of the flow liquid passes on the third cross conduit 5, and so on, so that the liquid is dispersed into a progressively larger part of the cross-section of the stream 1.

If the flow is increased in an attempt to extend the distribution to more and more cross conduits the condition will eventually be reached in which the first cross conduit runs full of fuel, but this is not a desirable working state since the liquid leaving the first cross conduit will no longer be effectively broken up and dispersed by gaseous fluid flowing through that cross conduit.

While it is convenient for manufacturing purposes to make the main and cross conduits of circular cross-section this is not an essential condition and the conduits may be made of oval or polygonal shape. Nor need the conduits have a constant cross-section shape or area throughout, but the flow path width of intersecting conduits should be substantially the same at the intersection, the width of the cross conduit being permissibly a little greater than but not smaller than the width of the main conduit. The spacing of the cross conduits may be either equal or unequal and may be chosen to provide a desired liquid distribution pattern.

The end of the main conduit 2 through which liquid is not admitted should be closed or otherwise isolated from the effect of the stream passing across it. Alternatively, if there are three or more cross conduits, liquid may be admitted into the main conduit at both ends. As another alternative, as shown in FIGURE 6, two main conduits 21 and 22 may extend in opposite directions from a common fuel duct 23. In this figure, the device is shown mounted in a duct 24 by brackets 25. Further main conduits may be added if desired and may radiate at equal or unequal spacings from the common fuel duct.

In the constructional example shown in FIGURES 2 and 3 the main conduit 2 and four cross conduits 3, 4, 5 and 6 are all formed as circular section bores in a solid strut-like member 11 which is generally of streamlined cross-section, in order to avoid the formation of a turbulent wake in the stream, but has cylindrical bosses 12 at the positions occupied by the cross conduits. At one end the strut 11 has a hollow cylindrical enlargement 13 which is internally screw threaded at 14 to receive a metering device 15. The main conduit 2 extends from the cylindrical chamber to near the other end of the strut 11, so that that end of the conduit 2 is closed. The metering device 15 comprises a diaphragm 16 having a central hole 17 and, on the upstream side of the hole, an obturator 18 which is adjustable for position in relation to the diaphragm. A further diaphragm 19 with holes 20 offset from the hole 17 breaks up the jet emerging from the hole 17. A metering device of this kind is capable of providing an approximately linear pressure-flow characteristic so that a desired variation of liquid flow rate may be achieved by supplying liquid to the metering device at a pressure varying in direct proportion with the desired flow rate.

In use the device is mounted in the moving stream with the cross conduits 3, 4, 5 and 6 aligned with the direction of the stream. Up to a first critical supply pressure all the liquid passing through the metering device 15 is dispersed out through the downstream end of the first cross conduit 3 in admixture with gaseous fluid entering the conduit 3 at its upstream end. As the pressure increases above the first critical pressure and above second and third critical pressures so distribution of the liquid spreads to the successive cross conduits 4, 5 and 6.

By way of numerical example, a device similar to that shown in FIGURES 2 and 3 having four 3/16 inch diameter cross conduits 3/4 inch long spaced 1 1/4 inches apart along a main conduit also of 3/16 inch diameter mounted in an air stream at atmospheric pressure having a velocity of 350 feet per second had experimentally observed first, second and third critical liquid flows at 198, 316 and 474 pounds per hour when supplied with fuel oil having a specific gravity of 0.8.

FIGURES 4 and 5 show the general form of the patterns of liquid distribution obtained with varying liquid flow rate. These diagrams must be regarded as approximate and possibly somewhat idealised since the experimental determination of this information is not easy to obtain with accuracy.

In FIGURE 4 the curves A, B, C and D represent, for progressively increasing rates of supply of liquid to a device such as is shown in FIGURES 2 and 3 operating in an airstream of constant velocity, the variation of local fuel/air ratio along a line which is the intersection of the plane containing the axes of the cross conduits with a transverse plane a short distance downstream of the conduits. The points 3, 4, 5 and 6 on the base of the figure correspond to the points on the intersection line which are directly downstream of the respective cross conduits 3, 4, 5 and 6.

The curve A shows that at that liquid supply rate liquid is discharging from the first cross conduit 3 only. The pronounced hump of the curve shows that at the transverse plane chosen for the analysis there is a greatest concentration of fuel droplets (i.e. highest fuel/air ratio) immediately opposite the cross conduit 3, and that this reduces outwardly until at a distance equal to half the spacing of the cross conduits the fuel/air ratio is practically zero. In other words, all the fuel droplets from the conduit 3 would pass through a ring of diameter equal to the spacing of the cross conduits and centered on the axis of the conduit 3. Naturally the diameter of the ring required to contain all the liquid droplets depends upon how far it is downstream from the outlet end of the conduit 3.

The curve B shows that at this higher rate of liquid supply the amount discharging from the conduit 3 has increased and that there is also a discharge from the next cross conduit 4. The area of the transverse plane covered by the discharge from conduit 3 has also increased so that its diameter is now nearly twice the spacing of the cross conduits and there is consequently overlapping of the areas covered by the discharges from conduits 3 and 4. The result of this is the double-humped curve B.

At the still higher liquid supply rate corresponding to curve C the third cross conduit 5 is discharging, the discharge from conduit 4 has increased, while that from conduit 3 has fallen a little. Finally, at the flow rate corresponding to the curve D the condition has been reached at which all the cross conduits are discharging about equally, with a tendency for the discharge to increase from the first to the last in the direction of liquid supply.

If to the group of cross conduits there is apportioned a part or the whole of the cross-section of the airstream, so that the group of conduits can be said to serve that cross-sectional area of airstream, an overall fuel/air ratio can be calculated for each liquid supply rate. In FIGURE 5 such overall fuel/air ratios corresponding to the curves A, B, C and D are plotted against the position along the intersection line, which forms the base of FIGURE 4, of the centre of gravity of the fuel droplets discharged in an element of time. Since in FIGURE 4 the air mass flow rate is assumed uniform throughout the airstream, this centre of gravity is the same thing as the centre of gravity of a body made up of an assembly of conical bodies such as constitute the components of the "solid" figures of which the curves A, B, C and D are cross-sections.

The centres of gravity thus obtained may be regarded as the position of an equivalent single cross conduit or other discharge source which, if it could produce corresponding spreads at the various liquid supply rates would roughly replace the several cross conduits. The full line of FIGURE 5 thus shows how the position of this equivalent source progresses along the intersection line from an initial position at the lowest liquid supply rate opposite the first cross conduit 3 to a final position at the highest liquid supply rate a little over half way from the conduit 4 to the conduit 5.

Changes in the density of the airstream at constant velocity affect this curve to an extent which may be gauged from the fact that doubling the density moves the curve approximately to the broken line position F, while halving the density moves it approximately to the chain-dotted line position G.

Changes in the velocity of the airstream at constant density produce relatively less change in the distribution pattern than do changes in density at constant velocity, that is to say doubling or halving the velocity produces a smaller change than is indicated by the curves F and G in FIGURE 5. Where the device is used in an airstream of constant Mach number the effect of such velocity changes as occur in practice is insignificant. The device will operate at low as well as high air speeds.

I claim:

1. Apparatus for dispersing liquid into a stream of gaseous fluid flowing in a predetermined direction, comprising a main conduit, means for supplying liquid into one end of the main conduit, a first straight cross conduit intersecting the main conduit, at least one second straight cross conduit intersecting the main conduit at a distance from the said end greater than the distance of the first conduit from the said end, whereby liquid in order to reach the second conduit from the said end must cross the first conduit, all the cross conduits being open at both ends and having a common axial direction and each cross conduit having at its intersection with the main conduit a flow path width, normal to the axes of both conduits, not substantially less than that of the main conduit, and each cross conduit extending on each side of the main conduit a distance not substantially less than the flow path width of the main conduit, means for aligning the axial direction of the cross conduits with the flow direction of the stream, and means for controlling the flow of the liquid into the main conduit.

2. Apparatus according to claim 1 including a duct wall which confines the stream of gaseous fluid, and in which the main conduit is fixed to the wall and extends into the duct normally to the wall.

3. Apparatus according to claim 1 in which there are three or more cross conduits and liquid is admitted into the main conduit at both ends.

4. Apparatus according to claim 1 in which two main conduits extend in opposite directions from a common fuel admission duct.

5. Apparatus according to claim 1 in which the conduits are all formed as bores of circular cross section in a solid strut-like member of generally streamlined cross section with bosses at the positions of the cross conduits.

6. Apparatus according to claim 1 associated with a fuel admission duct in which is a metering device having an approximately linear pressure-flow characteristic.

References Cited in the file of this patent
UNITED STATES PATENTS
2,585,205    Young _____ Feb. 12, 1952